Oct. 4, 1932.    J. N. WHITEHOUSE    1,881,038
METHOD OF PRODUCING A COMPOSITE BUTTON
Filed June 9, 1928
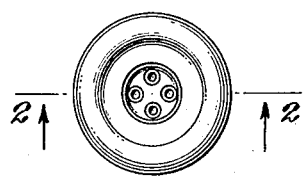
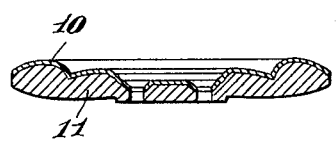
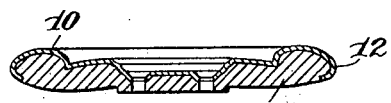
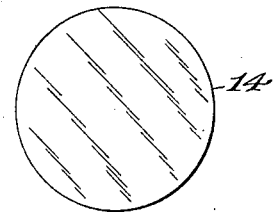
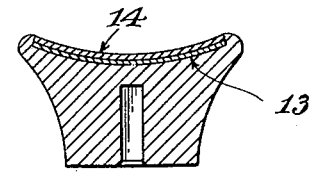

Patented Oct. 4, 1932

1,881,038

UNITED STATES PATENT OFFICE

JOHN N. WHITEHOUSE, OF NEW YORK, N. Y.

METHOD OF PRODUCING A COMPOSITE BUTTON

Application filed June 9, 1928. Serial No. 284,185.

This invention relates to buttons and similar objects, and aims to provide an article of this class which is inexpensive to manufacture, attractive in appearance, and durable.

Specifically I propose to make a button having a body formed of a phenol condensation product or other synthetic resin compounds, or materials having like qualities, and a facing of celluloid having a substantially welded relation with the body.

It has heretofore been proposed to make such articles of a molded phenol condensation product, which is comparatively inexpensive. However, for economical production it is necessary that the molding and "curing" operations be accomplished by means of automatic machinery, and with great speed. A phenol condensation product does not lend itself to these commercial conditions, because for best results a "curing" time of up to three minutes is demanded, and no way to escape the speed limitation thus imposed on automatic molding and "curing" operations has heretofore been suggested. Furthermore, articles of a phenol condensation product alone do not have a sufficiently attractive appearance.

I propose to form the body of a button (for instance) of a phenol condensation product and to weld to such body, as part of the operation of "curing" the phenol condensation product and molding the button as a whole, a facing of celluloid. The principal difficulty inherent in the problem thus proposed, resides in the fact that the "curing" temperature of the phenol condensation product is above the decomposing temperature of the celluloid. This difficulty is removed by the particular process which I employ, and the end result is an article in which the celluloid facing is substantially welded to the underbody, substantially without deterioration of either material. And the resulting article has the added attractiveness due to the translucence of the celluloid.

In the accompanying drawing I have shown examples of buttons and other articles illustrating the kind of products which I have in mind, and I will describe the essentials of the process to be used in making them.

In the drawing:

Fig. 1 is a plan view of a button involving the invention.

Fig. 2 is a section on line 2—2 of Fig. 1.

Fig. 3 is a section similar to Fig. 2 showing a modification.

Fig. 4 is a plan view of one of the face discs used in the structure of Fig. 6.

Fig. 5 is a plan view of a second face disc used in the modification of Fig. 6.

Fig. 6 is a plan view of a modified button structure.

Fig. 7 is a section on line 7—7 of Fig. 6.

Referring to the drawing more particularly, the button shown in Figs. 1, 2 and 3 comprises a celluloid facing indicated by the numeral 10, which has a welded relation to a body of phenol condensation material 11. This facing may be about 15/1000 of an inch thick, or even thinner, the maximum thickness being about 1/10 the general thickness of the button. In practice phenol condensation material, preferably in powdered form, in proper quantity, is placed in a mold having internal conformation suitable for the production of the finished shape, and there given a heat treatment of from say 200° to 275° F. to initiate "curing". Alternatively, the material might be preliminarily heated before it is put into the mold. Thereafter the properly shaped facing disc of celluloid, which has been cut from a flat sheet of celluloid of desired color and thickness, is laid over the preliminarily heated phenol condensation material, and substantially simultaneously a die member suitably shaped to give the desired face conformation to the button, and also if desired to pierce the button with sewing apertures or the like, contacts with the facing 10 and compresses the same together with, and against, the phenol condensation material within the mold, giving the article the desired finished form. As a result of the pressing operation the temperature of the phenol condensation material, which as stated above has already been preliminarily heated, is raised to the "curing" optimum, and very little dwell is necessary, because the preliminary heat treatment will have brought the phenol condensation material close to the "curing" stage, and only the brief moment occupied by the molding compression is needed to complete the "curing". It will be evident therefore that if a dial feed or the like be employed, and the preliminary treatment of the phenol condensation material take place at one or more stations, the complete operation comprising an endless succession of steps, commercial production by automatic machinery and at a very rapid rate, is possible.

As a result of the described operations the celluloid facing is substantially welded to or coalesced with the body, which latter is now in the solid and "cured" condition. I am unable to set forth with certainty just what physical and/or chemical changes, actions and reactions take place in and between the celluloid and the phenol condensation material in producing the welding or coalescence. It may be that there is an actual surface merger, analogous to what is produced in the welding together of metals. Or it may be that because of the surrounding heat and pressure conditions, substantially all air is eliminated from between the contacting surfaces, so that atmospheric pressure is operative. Or again, superficial projections of phenol condensation material may be driven into the relatively soft celluloid, and thus hold the two materials together by mechanical penetration and anchorage. Indeed any one or more of these hypotheses may explain the undeniably advantageous and surprising results which are obtained. Certain it is that the celluloid facing is intimately united with the body, for all practical purposes as though they were homogeneous, and the comparative translucency or transparency of the celluloid is not impaired.

One of the circumstances to which I have already called attention is the fact that by my process it is possible to operate simultaneously upon two materials to make of them a combined finished product, notwithstanding that the temperatures involved in the combining operation run well above the point at which one of the materials (the celluloid) would ordinarily be destroyed. I do not undertake to explain this anomaly, but suggest that it may be because the die member which compresses the celluloid facing and the phenol condensation material body together and finish-forms the article, is sufficiently cooler than the mold member and the heated phenol condensation material so that excessive and dangerous heat may be harmlessly conducted away. And it is a fact, of course, that in the compression, which as before stated, raises the temperature of the compressed bodies, there is effective exclusion of oxygen from the outside.

The result of the process is to produce an article with a desirably smooth facing, having visual characteristics incidental to the presence of celluloid, and withal an article which as a whole is not easily broken or fractured, and of finished appearance. I have found that there is no "blistering" of the celluloid facing, even when it is present as a very thin sheet.

Fig. 3 shows how the facing 10 may be extended along the sides and partly under the body 11, as indicated at 12, in order to prevent accidental mechanical stripping, which might result if a sharp instrument could readily be inserted in the joint between the celluloid and the phenol condensation body.

Figs. 4 to 7 illustrate the application of the invention to a button for a typewriting or computing machine, providing an economical and efficient method for applying legends to such buttons. In this case the desired legend may be printed on a disc of white (for instance) celluloid 13 shown in Fig. 4. This disc 13 is then covered with a second disc 14 of transparent celluloid, and the two discs are given a preparatory treatment to composite them, or the compositing may be performed in the final molding operation.

I claim:

The method which consists in placing in a mold a charge of a phenol condensation product, said charge being brought to a temperature of from 200° to 275° F., applying a facing of celluloid to the charge, and substantially simultaneously subjecting the charge to a short period of compression to raise the temperature of the charge to the "curing" temperature and to cause the charge to adhere to the celluloid facing while maintaining the celluloid facing in contact with a support, thereby preventing the celluloid from reaching its decomposing temperature.

In testimony whereof I affix my signature.

JOHN N. WHITEHOUSE.